(12) United States Patent
Peters (10) Patent No.: US 12,553,406 B2
(45) Date of Patent: Feb. 17, 2026

(54) EVAPORATIVE EMISSIONS SYSTEM VAPOR BLOCKING VALVE LEAK DIAGNOSTIC WITH A SINGLE PRESSURE SENSOR

(71) Applicant: Stoneridge Control Devices, Inc., Novi, MI (US)

(72) Inventor: Mark William Peters, Wolverine Lake, MI (US)

(73) Assignee: STONERIDGE CONTROL DEVICES, INC., Novi, MI (US)

( * ) Notice: Subject to any disclaimer, the term of this patent is extended or adjusted under 35 U.S.C. 154(b) by 367 days.

(21) Appl. No.: 18/118,517

(22) Filed: Mar. 7, 2023

(65) Prior Publication Data

US 2024/0301847 A1 Sep. 12, 2024

(51) Int. Cl.
| | |
|---|---|
| *F02M 25/08* | (2006.01) |
| *G01M 3/28* | (2006.01) |
| *G07C 5/00* | (2006.01) |
| *G07C 5/08* | (2006.01) |

(52) U.S. Cl.
CPC ...... *F02M 25/0818* (2013.01); *G01M 3/2876* (2013.01); *G07C 5/006* (2013.01); *G07C 5/0808* (2013.01); *G07C 5/0825* (2013.01)

(58) Field of Classification Search
CPC . F02M 25/0818; G01M 3/2876; G07C 5/006; G07C 5/0808; G07C 5/0825
See application file for complete search history.

(56) References Cited

U.S. PATENT DOCUMENTS

| | | | |
|---|---|---|---|
| 2020/0141360 A1* | 5/2020 | Takagi | F02M 25/0809 |
| 2022/0252024 A1* | 8/2022 | Uematsu | F02M 25/089 |

* cited by examiner

*Primary Examiner* — Stephen D Meier
*Assistant Examiner* — Quang X Nguyen
(74) *Attorney, Agent, or Firm* — Carlson, Gaskey & Olds, P.C.

(57) ABSTRACT

A method is disclosed of testing operability of a vapor blocking valve (VBV) in a first passageway that is fluidly arranged between a fuel tank and a carbon canister. A canister valve solenoid (CVS) is arranged in a second fluid passageway that fluidly interconnects the carbon canister and an atmospheric port. The method includes obtaining a first desired pressure in the first passageway, closing the VBV, opening the CVS, monitoring a first test pressure in the first passageway with a pressure sensor, obtaining a second desired pressure in the first passageway, opening the VBV, opening the CVS, monitoring a second test pressure in the first passageway with the pressure sensor, comparing the first and second test pressures, and determining the VBV operability based upon the comparing step.

11 Claims, 5 Drawing Sheets

EVAPORATIVE EMISSIONS SYSTEM VAPOR BLOCKING VALVE LEAK DIAGNOSTIC WITH A SINGLE PRESSURE SENSOR

TECHNICAL FIELD

This disclosure relates to a vehicle internal combustion engine evaporative emissions system with leak diagnostics for its vapor blocking valve.

BACKGROUND

Evaporative emissions systems have long been required for gasoline powered vehicles. The evaporative system must test for leaks, flow and functional tests of evaporative components that could lead to a degradation in system function. The gasoline engine, a pump, or fuel tank temperature change is used either to create a vacuum or pressurize the system for demonstration of leaks or flow. Various valves may be closed while testing to maintain system pressure or restrict flow so that system responses can be monitored by the use of a transducer.

Regulatory agencies in the United States and other jurisdictions require a vehicle manufacturer to provide an evaporative emissions system to diagnose failures of any failed component that could cause an increase in emissions detrimental to the environment. Every additional component incorporated into the evaporative emissions system for the sole purpose of testing for a failed component adds cost to the system.

A typical evaporative emissions system uses a vapor blocking valve (VBV) between the fuel tank and a carbon canister. One conventional method of testing the VBV uses two pressure sensors: one pressure sensor on either side of the VBV. The evaporative emissions system by design is free flowing except for the carbon canister where restriction increases with flow rate. The primary function of the VBV when energized closed is to direct purge flow through the canister while reducing flow from the fuel tank vapor space. Since air flow always goes to the path of least resistance, if the VBV is unenergized, flow first comes from the vapor space of the fuel tank before drawing through the carbon canister. The pressure sensor located between the VBV and the fuel tank is used to ensure that tank pressures are maintained within the manufactures design range. The pressure sensor located between the VBV and the carbon canister can be used for diagnosing a faulted condition on the VBV.

SUMMARY

In one exemplary embodiment, a method of testing operability of a vapor blocking valve (VBV) is disclosed. The VBV is in a first passageway that is fluidly arranged between a fuel tank and a carbon canister, and a canister valve solenoid (CVS) is arranged in a second fluid passageway that fluidly interconnects the carbon canister and an atmospheric port. The method includes obtaining a first desired pressure in the first passageway, closing the VBV, opening the CVS, monitoring a first test pressure in the first passageway with a pressure sensor, obtaining a second desired pressure in the first passageway, opening the VBV, opening the CVS, monitoring a second test pressure in the first passageway with the pressure sensor, comparing the first and second test pressures, and determining the VBV operability based upon the comparing step.

In a further embodiment of any of the above, the method includes a third passageway that fluidly interconnects the carbon canister and an engine. A purge valve is arranged in the third passageway. The first and second desired pressure obtaining steps are performed by exposing the first passageway to engine vacuum with the purge valve in an open position.

In a further embodiment of any of the above, the first and second desired pressure obtaining steps are performed with the engine running.

In a further embodiment of any of the above, the first and second desired pressure obtaining steps are performed with the CVS closed.

In a further embodiment of any of the above, the CVS opening steps fluidly connect the first passageway to the atmospheric port and ambient air.

In a further embodiment of any of the above, the first and second test pressure monitoring steps include storing at least one characteristic of each of the first and second test pressures. The comparing step includes comparing the at least one characteristic of each of the first and second test pressures.

In a further embodiment of any of the above, the at least one characteristic includes a slope for each of the first and second test pressures.

In a further embodiment of any of the above, the at least one characteristic includes a pressure of each of the first and second test pressures after a predetermined testing time.

In a further embodiment of any of the above, the method includes the step of storing the VBV operability as a PASS or a FAIL.

In a further embodiment of any of the above, the method includes the step of communicating the stored VBV operability to an onboard diagnostic (OBD) controller, and the step of the OBD controller triggers a Check Engine light in response to the FAIL.

In another exemplary embodiment, an evaporative emissions system includes a vapor blocking valve (VBV) that is arranged in a first passageway that fluidly interconnects a fuel tank and a carbon canister. A first valve is arranged in a second passageway that fluidly interconnects an atmospheric port to the carbon canister. A second valve is arranged in a third passageway that fluidly interconnects a pressure source to the carbon canister. A pressure sensor is arranged in the first passageway fluidly between the VBV and the fuel tank. A controller is in communication with the pressure sensor, the VBV and the first and second valves. The controller is configured to actuate the VBV and the first and second valves between open and closed positions in response to a test procedure to monitor first and second test pressures with the pressure sensor respectively during a VBV closed position and a VBV open position to determine VBV operability.

In a further embodiment of any of the above, the system includes a leak detection module (LDM) that provides the atmospheric port. The LDM includes a canister valve solenoid (CVS) that provides the first valve, a pump, a check valve and a pressure transducer. A first passage fluidly connects the CVS to the atmospheric port. A second passage fluidly connects the carbon canister to the pump through the check valve. The pump fluid is arranged between the check valve and atmospheric port.

In a further embodiment of any of the above, the second valve is a purge valve that is configured to selectively provide fuel vapor from at least one of the fuel tank and the carbon canister in response to a command from the controller.

In a further embodiment of any of the above, the purge valve is configured to provide a vacuum to the first passageway during the test procedure.

In a further embodiment of any of the above, the controller is configured to store at least one characteristic of each of the first and second test pressures. The controller is configured to compare the at least one characteristic of each of the first and second test pressures to determine VBV operability.

In a further embodiment of any of the above, the controller is configured to store the VBV operability as a PASS or a FAIL.

In a further embodiment of any of the above, the controller is configured to communicate the stored VBV operability to an onboard diagnostic (OBD) controller that is configured to trigger Check Engine light in response to the FAIL.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
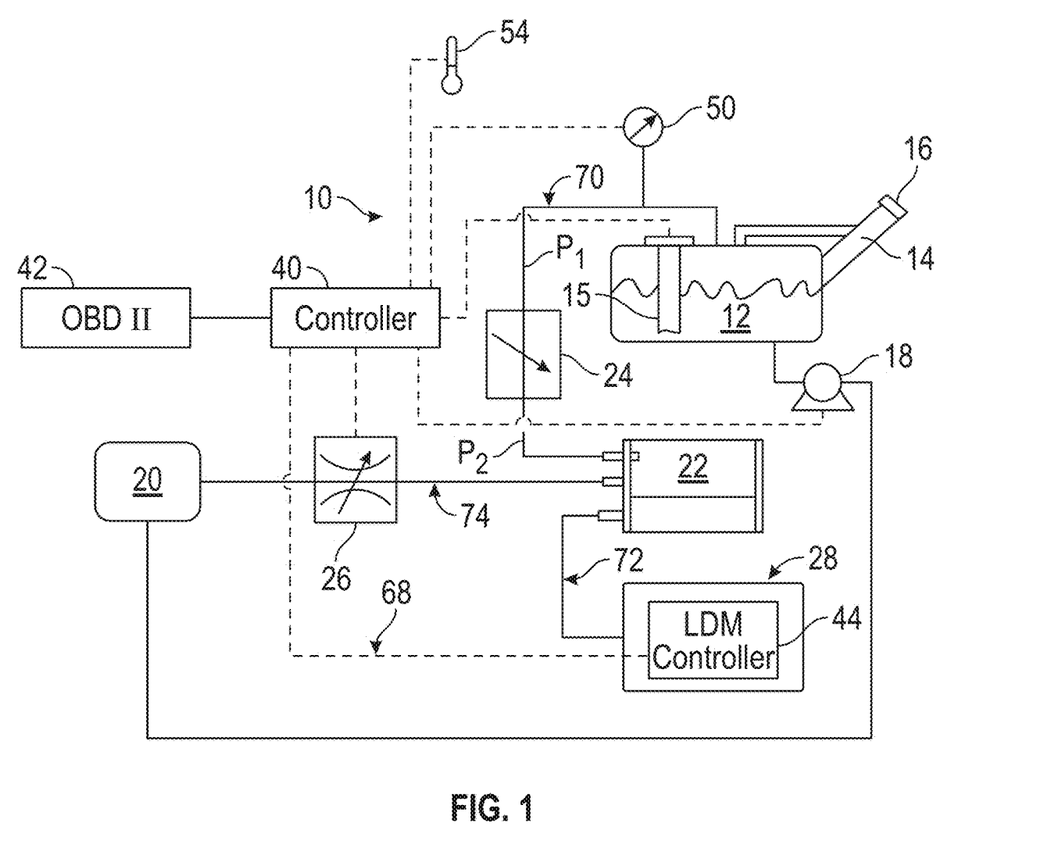
FIG. 1 schematically illustrates portions of one example evaporative fuel system.

FIG. 1 schematically illustrates a portion of an example evaporative fuel system 10. It should be understood that other types of systems may be used. The system 10 includes a fuel tank 12 having a fuel filler 14 with a fill cap 16. A fuel pump 18 supplies gasoline, for example, from the fuel tank 12 to an internal combustion engine 20, which provides propulsion to a vehicle. A fuel level sensor 15 is in communication with a controller 40, which may be an engine controller, and measures a level of fuel within the fuel tank 12, which also correlates to an amount of fuel vapor within the fuel tank 12.

The system 10 is configured to capture and regulate the flow of fuel vapors within the system. In one example, a vapor blocking valve (VBV) 24 is arranged in a first passageway 70 fluidly between the fuel tank 12 and a carbon canister 22, which captures and stores fuel vapors for later use by the engine 20. A purge valve 26 is fluidly arranged in a third passageway 74 and interconnected between the canister 22 and the engine 20. In one example, the controller 40 regulates a position of the purge valve 26 during engine operation in response to a purge command from the engine controller 40, for example, to selectively provide the fuel vapors to the engine 20 during fuel combustion to make use of these fuel vapors.

Figure 2:
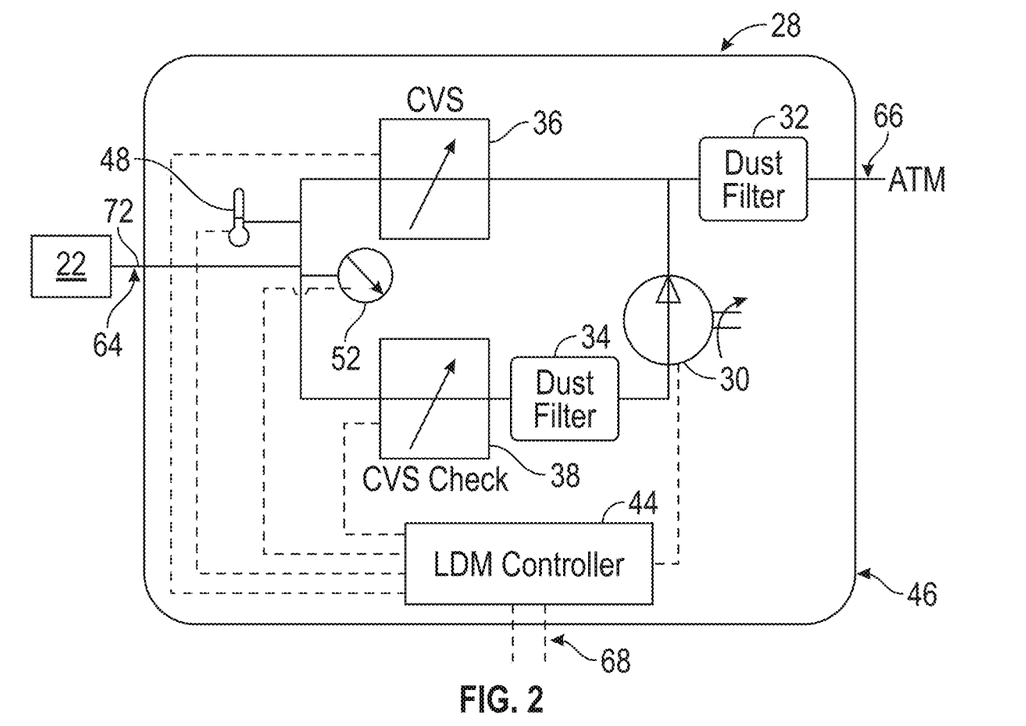
FIG. 2 is a schematic view of a leak detection module (LDM) for the system shown in FIG. 1.

Regarding the evaporative emissions system, the integrity of the system 10 must be periodically tested to ensure no fuel vapor leakage. One type of system 10 uses a leak detection module (LDM) 28, which can be used to pull a vacuum and/or pressurize the system to determine whether a leak exists, for example, using a pressure sensor 52 (FIG. 2). In one example leak test procedure, the purge valve 26 is closed and the LDM controller 44 operates the leak detection module 28 to evacuate or pressurize the system. Another pressure sensor 50 is arranged in the first passageway 70 and may be used to monitor the pressure of fuel vapors within the fuel tank 12 during other conditions.

An ambient temperature sensor, which is optional, is in communication with the LDM controller 44. In one example, the temperature sensor 48 is arranged within a housing 46 and in fluid communication with at least one of the first and second ports 64, 66. In another example, the temperature sensor 54 is arranged outside the LDM 28. The temperature sensor may be useful for quantify heat transfer characteristics of the fuel vapor within the fuel tank 12 relative to surrounding atmospheric temperature.

In one example, the LDM 28 has its own controller, i.e., LDM controller 44, separate and discrete from the engine controller 40. The controllers 40, 44 are arranged remotely from one another is separate housings. Typically, the engine controller 40 is arranged at or near the vehicle's engine bay, and the LDM controller is arranged near the fuel tank 12 and/or carbon canister 22, which is often at the rear of the vehicle.

The example LDM 28 is schematically shown in FIG. 2. The LDM 28 includes a pump 30 arranged in a housing. Some customers prefer a system that operates using a vacuum, while other customers prefer a system that is pressurized. The rotational direction of the pump determines whether the system is pressurized or a vacuum is applied. So, to provide a pressurized evaporative emissions system test, the pump 30 will draw air from a second port 66 in fluid communication with atmosphere and through a filter 32 and direct the air towards the canister 22. Another filter 34 may be provided on the other side of the pump 30 to protect the pump from debris. To provide a depressurized or negative pressure evaporative emissions system test (i.e., vacuum), the pump 30 will draw air from the canister 22 and out to the atmosphere through the second port 66.

When the LDM 28 is not performing a leak check of the fuel system 10, a canister valve solenoid (CVS) 36 is in an open position to allow air to flow through a second passageway 72 between the rest of the system 10 (via canister 22) and atmosphere. This enables the system 10 to communicate air from the atmosphere through second port 66 as needed. The CVS 36 is arranged within the housing 46 and in fluid communication along the passage between first and second ports 64, 66.

When the LDM 28 is performing one type of leak test of the of the fuel system 10, the CVS 36 is in a closed position. A CVS check valve 38 is arranged in another passage and selectively blocks the canister 22 from the pump 30 and atmosphere via the second port 66. The pressure transducer 52 is arranged to read the pressure in the LDM when the CVS 36 is closed, although the pressure transducer can be used for other purposes.

The above-described system 10, LDM 28 and method of operation are exemplary only. As can be appreciated, proper operation of the system 10 is highly dependent on desired operation of the various fluid valves (here, pneumatic), which must reliably open and close when commanded to communicate and block flow when needed during both the evaporative emissions system test procedure and normal engine operation. The above leak test using the LDM 28 is not sufficient to test the VBV 24, the operability of which must be tested under current federal regulations. While there may be numerous ways to test the VBV 24, it is desirable to design a system 10 with minimal components for performing such a test to keep overall system cost low.

Returning to FIG. 1, the VBV 24 is used to isolate or block fuel vapor in the fuel tank 12 from the rest of the system 10. Testing the operability of the VBV 24 thus involves verifying that the VBV 24 is capable of closing and remaining in the closed position when desired. The disclosed system 10 and test method 100 (FIG. 4) uses a single, common pressure sensor 50 to diagnose VBV functionality. That is, no other pressure sensor than pressure sensor 50 is needed to perform the VBV test.

Figure 3A:
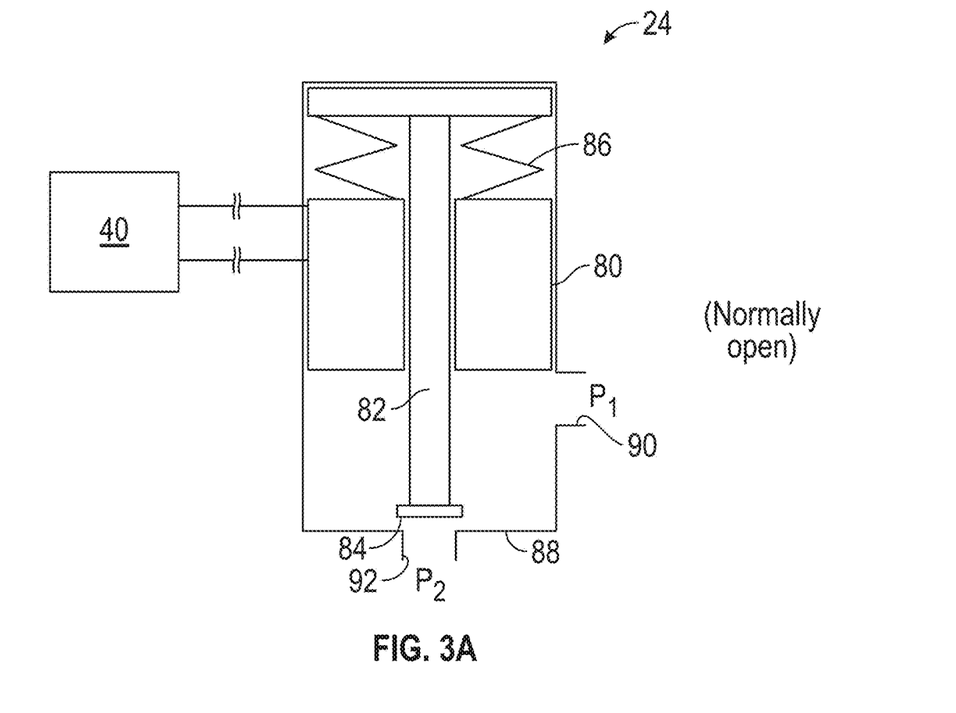
FIGS. 3A and 3B respectively depict an example vapor blocking valve (VBV) in open and closed positions.

As shown in FIG. 1, the VBV 24 separates the first passageway 70 into first and second sides, which are respectively at first and second pressures $P_1$, $P_2$ at first and second openings 90, 92, respectively. The VBV 24 is shown in its normally opened and energized closed positions, respectively, in FIGS. 3A and 3B. An exemplary VBV 24 includes a coil 80 disposed about a pole piece 82 for moving a valve seat 84 from the open position in which the valve seat 84 is unseated with respect to a body 88 to a closed position in which the valve seat 84 abuts the body 88. A spring 86 biases the valve seat 84 to the normally opened position (FIG. 3A) when the coil 80 is unenergized. When the coil 80 is energized in response to a signal from the controller 40, for example, the coil 80 moves the pole piece 82 and its associated valve seat 84 closed (FIG. 3B), obstructing the flow through the VBV 24.

Figure 3B:
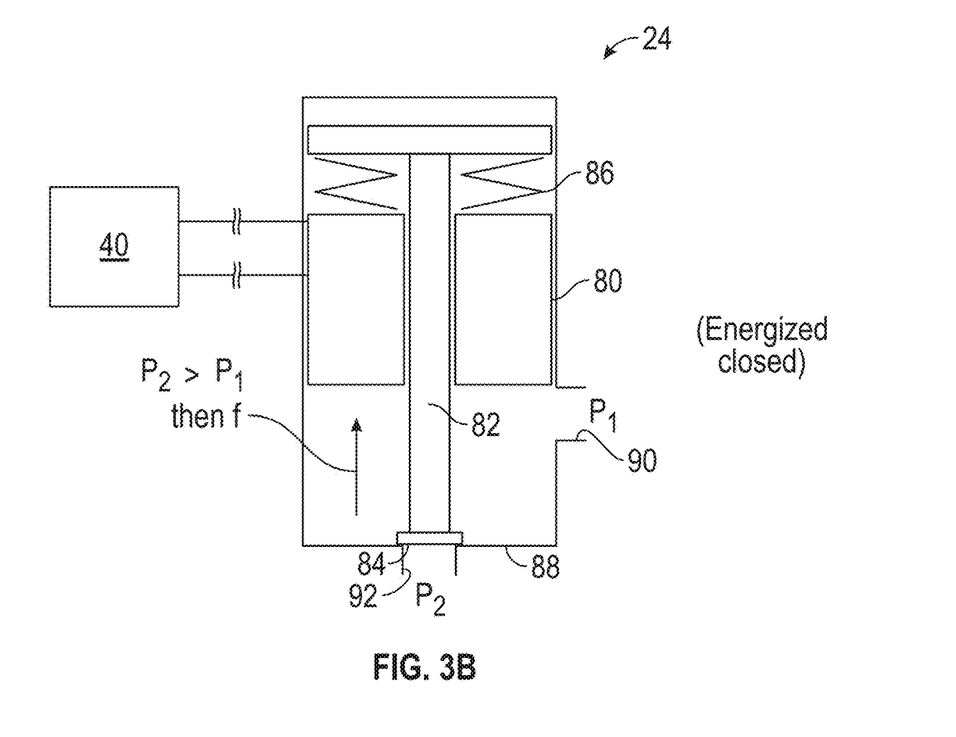

As can be appreciated, when the VBV 24 is normally opened, any fluid within the first passageway 70 is free to move through the VBV according to the pressure differential across the VBV 24. When the VBV 24 is closed, as shown in FIG. 3B, any fluid flow will be obstructed by the valve seat 84. Even with the VBV 24 closed, a high enough pressure differential across the valve seat 84 may cause a force F capable of unseating the valve seat 84 from the body 88, enabling a slow leakage across the VBV 24. If this leakage exceeds an undesired amount, then the VBV 24 will FAIL the leak test. A failed test indicates that the valve seat 84 is partially stuck open, or the VBV is otherwise incapable of maintaining the valve seat 84 in a closed position for desired operation of the system 10.

An OBDII system 42 (FIG. 1) communicates and/or is integrated with the engine controller 40 and uses the pressure information to generate engine malfunction codes that may be stored and for illuminating a "check engine" light on the vehicle instrument panel indicating vehicle service is needed.

Figure 4:
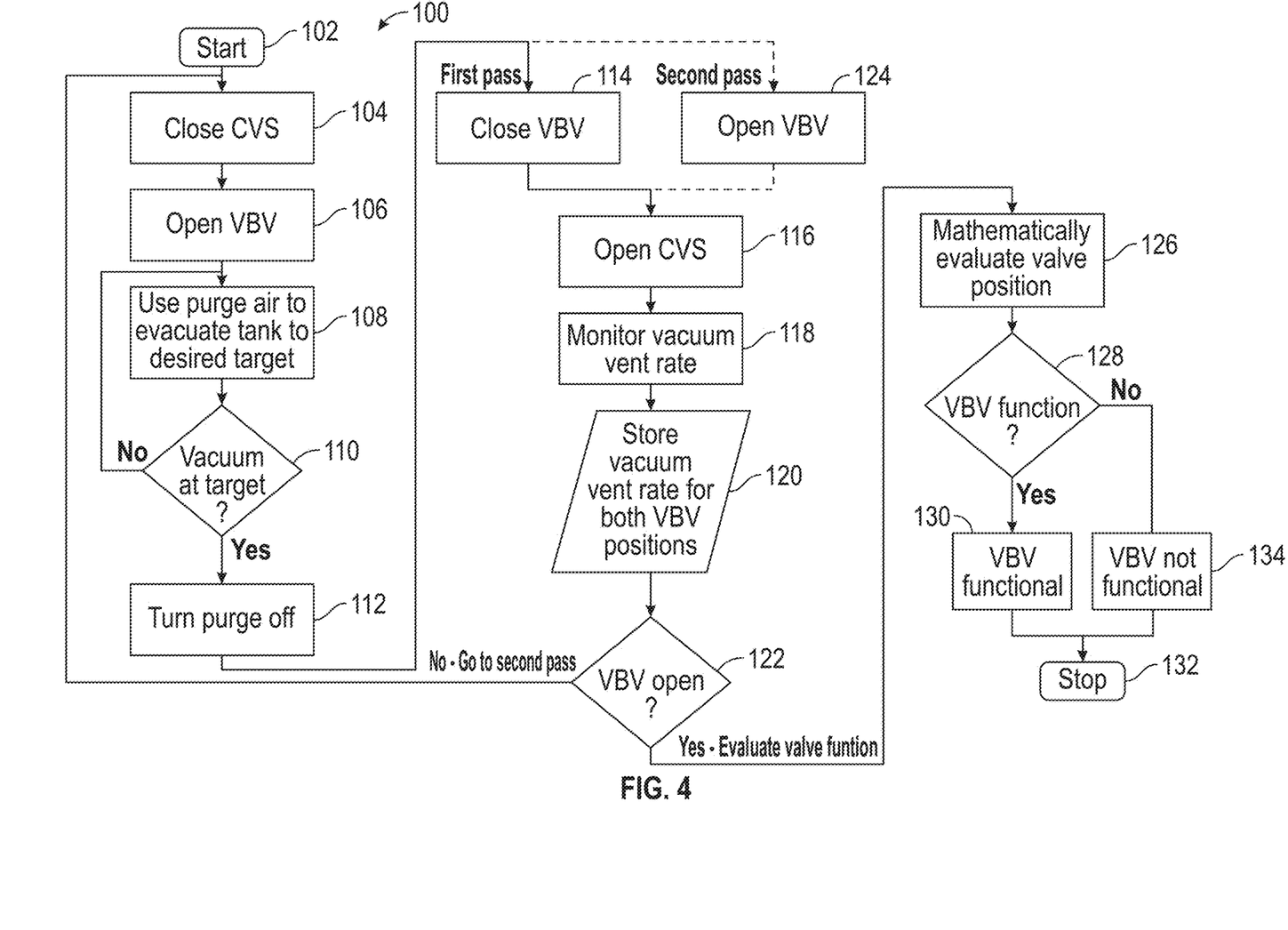
FIG. 4 is a flowchart depicting an evaporative emissions system leak test method.

An example test method 100 is depicted in FIG. 4. The test is initiated (block 102) when certain conditions have been satisfied (e.g., engine is running and/or idling). A first phase of testing includes obtaining a first desired pressure in the first passageway 70. This is achieved by closing the CVS 36 (block 104) and opening the VBV (block 106). With the engine 20 running, the purge valve 26 is opened (block 108) until the first desired pressure is achieved (block 110), at which point the purge valve 26 is closed (block 112).

With the first passageway 70 at the first desired pressure, the VBV 24 is closed (block 114). The CVS 36 is opened (block 116), and the pressure sensor 50 monitors (block 118) a first test pressure in the portion of the first passage 70, which is under vacuum, between the VBV 24 and the fuel tank 12. An open CVS 36 exposes the other portion of the first passage 70 to atmospheric pressure, creating a differential pressure across the VBV 24. At least one characteristic (e.g., one or more pressures at one or more predetermined times, the pressure curve, etc.) of the first test pressure is stored (block 120).

A second phase of testing is initiated (block 122), which repeats steps 104-112 to achieve a second desired pressure, which may be the same as the first desired pressure. Next, the VBV is opened (block 124), and steps 116-120 are repeated to monitor with the pressure sensor 50 and store a second test pressure. The order of the first and second phases may be reversed if desired, and other variations may be used and still remain within the scope of the invention.

Figure 5:
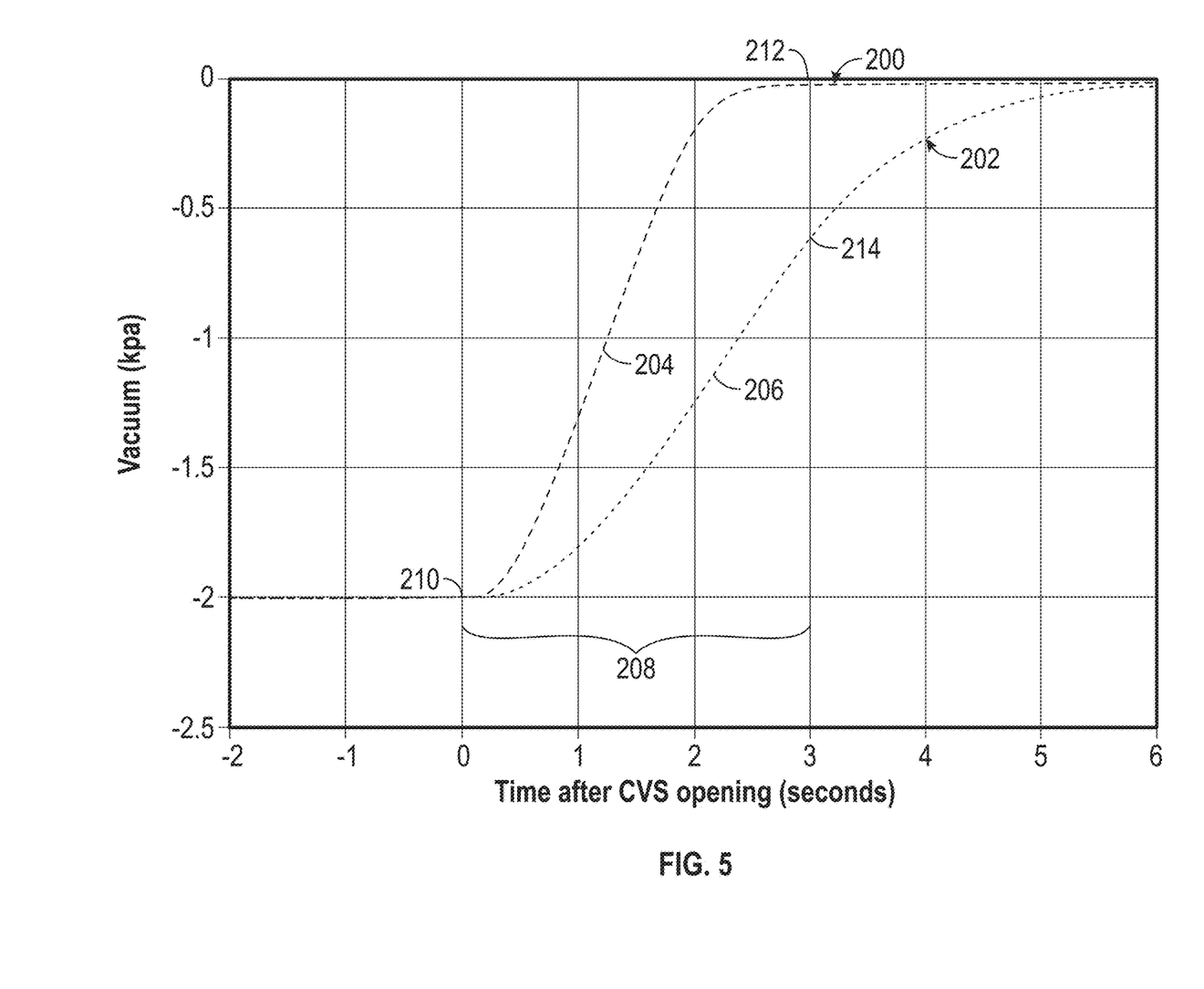
FIG. 5 is a graph showing the pressures monitored during the leak test method used to determine the VBV health.

Example second and first test pressure curves are respectively shown at 200, 202 in FIG. 5. As can be appreciated, the second test pressure should reach atmospheric pressure more rapidly than the first test pressure, as the VBV 24 is closed during the first phase of the test during which the first test pressure is monitored. If during the first phase of the test (VBV 24 closed), the first test pressure reaches atmospheric pressure sooner than desired, this is indicative of a VBV FAIL. The VBV operability is accurately evaluated (128) by a comparison of the first and second test pressures (block 126) to one another and/or reference data.

In one example, the slopes 204, 206 of the second and first test pressure curves 200, 202 can be evaluated to determine VBV operability. Alternatively or additionally, pressures 212, 214 after predetermined time 208 from a starting time 210 can be compared to one another to determine VBV operability.

The test results either in a PASS (block 130) or a FAIL (block 134). Once the test is completed, the results can be stored (block 132) and communicated to another controller or other component.

The controller 40, LDM controller 44 and OBDII system 42 may be integrated or separate. In terms of hardware architecture, such the controllers can include a processor, memory, and one or more input and/or output (I/O) device interface(s) that are communicatively coupled via a local interface. The local interface can include, for example but not limited to, one or more buses and/or other wired (e.g., CAN, LIN and/or LAN) or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controllers may be a hardware device for executing software, particularly software stored in memory. The processor can be a custom made or commercially available processor, a central processing unit (CPU), an auxiliary processor among several processors associated with the controllers, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the controllers are in operation, its processor can be configured to execute software stored within the memory, to communicate data to and from the memory, and to generally control operations of the computing device pursuant to the software. Software in memory, in whole or in part, is read by the processor, perhaps buffered within the processor, and then executed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples. For example, the disclosed pump may be used in applications other than vehicle evaporative systems.

Although an example embodiment has been disclosed, a worker of ordinary skill in this art would recognize that certain modifications would come within the scope of the claims. For that reason, the following claims should be studied to determine their true scope and content.

What is claimed is:

1. A method of testing operability of a vapor blocking valve (VBV) in a first passageway fluidly arranged between a fuel tank and a carbon canister, the carbon canister is connected to an internal combustion engine via a purge valve, wherein a canister valve solenoid (CVS) is arranged in a second fluid passageway fluidly interconnecting the carbon canister and an atmospheric port, the method comprising:
   a) closing the CVS;
   b) opening the VBV;
   c) obtaining a first desired pressure in the first passageway with the internal combustion engine running and the purge valve open, then closing the purge valve;
   d) closing the VBV;
   e) opening the CVS;
   f) monitoring a first test pressure in the first passageway with a pressure sensor;
   g) obtaining a second desired pressure in the first passageway by repeating steps a) to c);
   h) opening the VBV;
   i) opening the CVS;
   j) monitoring a second test pressure in the first passageway with the pressure sensor;
   k) comparing the first and second test pressures;
   l) determining the VBV operability based upon the comparing step; and
   wherein steps a) through l) are performed sequentially.

2. The method of claim 1, comprising a third passageway fluidly interconnecting the carbon canister and an engine, a purge valve arranged in the third passageway, wherein the first and second desired pressure obtaining steps are performed by exposing the first passageway to engine vacuum with the purge valve in an open position.

3. The method of claim 2, wherein the first and second desired pressure obtaining steps are performed with the engine running.

4. The method of claim 1, wherein the first and second desired pressure obtaining steps are performed with the CVS closed.

5. The method of claim 1, wherein the CVS opening steps fluidly connect the first passageway to the atmospheric port and ambient air.

6. The method of claim 1, wherein the first and second test pressure monitoring steps include storing at least one characteristic of each of the first and second test pressures, wherein the comparing step includes comparing the at least one characteristic of each of the first and second test pressures.

7. The method of claim 6, wherein the at least one characteristic includes a pressure of each of the first and second test pressures after a predetermined testing time.

8. The method of claim 6, comprising the step of storing the VBV operability as a PASS or a FAIL.

9. The method of claim 8, comprising the step of communicating the stored VBV operability to an onboard diagnostic (OBD) controller, and the step of the OBD controller triggering a Check Engine light in response to the FAIL.

10. The method of claim 1, comprising a leak detection module (LDM) providing the atmospheric port, the LDM including the canister valve solenoid (CVS), a pump, a check valve and a pressure transducer, a first passage fluidly connecting the CVS to the atmospheric port, a second passage fluidly connecting the carbon canister to the pump through the check valve, the pump fluid arranged between the check valve and atmospheric port.

11. A method of testing operability of a vapor blocking valve (VBV) in a first passageway fluidly arranged between a fuel tank and a carbon canister, wherein a canister valve solenoid (CVS) is arranged in a second fluid passageway fluidly interconnecting the carbon canister and an atmospheric port, the method comprising:
   obtaining a first desired pressure in the first passageway;
   closing the VBV;
   opening the CVS;
   monitoring a first test pressure in the first passageway with a pressure sensor;
   obtaining a second desired pressure in the first passageway;
   opening the VBV;
   opening the CVS;
   monitoring a second test pressure in the first passageway with the pressure sensor;
   comparing the first and second test pressures;
   determining the VBV operability based upon the comparing step; and
   wherein the first and second test pressure monitoring steps include storing at least one characteristic of each of the first and second test pressures, wherein the comparing step includes comparing the at least one characteristic of each of the first and second test pressures, wherein the at least one characteristic includes a slope for each of the first and second test pressures.

* * * * *